United States Patent [19]
Corn

[11] Patent Number: 6,126,302
[45] Date of Patent: Oct. 3, 2000

[54] RECESSED SLIDE OUT VANITY MIRROR ASSEMBLY

[76] Inventor: Jack E. Corn, 1644 S. Jamestown, Tulsa, Okla. 74112-6832

[21] Appl. No.: 09/184,193

[22] Filed: Nov. 2, 1998

Related U.S. Application Data

[60] Provisional application No. 60/064,679, Nov. 3, 1997.

[51] Int. Cl.$^7$ ........................................... B60Q 3/06
[52] U.S. Cl. ........................ 362/492; 362/135; 362/136; 362/137; 362/142; 362/144
[58] Field of Search ........................... 362/492, 135–144; 359/841, 871, 872, 874, 876, 877; 248/475.1, 476, 479, 480; 296/97.4, 97.8, 97.11–97.13

[56] References Cited

U.S. PATENT DOCUMENTS

| | | | |
|---|---|---|---|
| 806,742 | 2/1905 | Hohein | 248/480 |
| 2,807,515 | 9/1957 | Dean | 312/227 |
| 4,469,365 | 9/1984 | Marcus et al. | 296/37.7 |
| 4,486,819 | 12/1984 | Marcus et al. | 362/142 |
| 4,558,930 | 12/1985 | Deedreek | 350/604 |
| 4,730,913 | 3/1988 | Boothe | 350/604 |
| 4,794,497 | 12/1988 | Jonsas et al. | 362/143 |
| 4,824,159 | 4/1989 | Fluharty et al. | 296/37.7 |
| 4,867,498 | 9/1989 | Delphia et al. | 296/37.7 |
| 4,989,910 | 2/1991 | Mersman et al. | 296/97.4 |
| 5,050,922 | 9/1991 | Falcoff | 296/37.7 |
| 5,174,644 | 12/1992 | Hermansson et al. | 362/83.1 |
| 5,473,516 | 12/1995 | Van Order et al. | 362/83.1 |
| 5,548,492 | 8/1996 | Hansen et al. | 362/492 |
| 5,651,605 | 7/1997 | Corn | 362/83.1 |

*Primary Examiner*—Sandra O'Shea
*Assistant Examiner*—Ismael Negron
*Attorney, Agent, or Firm*—Head, Johnson & Kachigian

[57] ABSTRACT

A vanity mirror assembly including a track having a first end. The track is moveable between a stowed and an extended position. A mirror extends from the first end of the track. A hinge is between the first end of the track and the mirror, whereby the mirror may rotate between a position parallel to said track and a position in angular relation thereto.

15 Claims, 12 Drawing Sheets

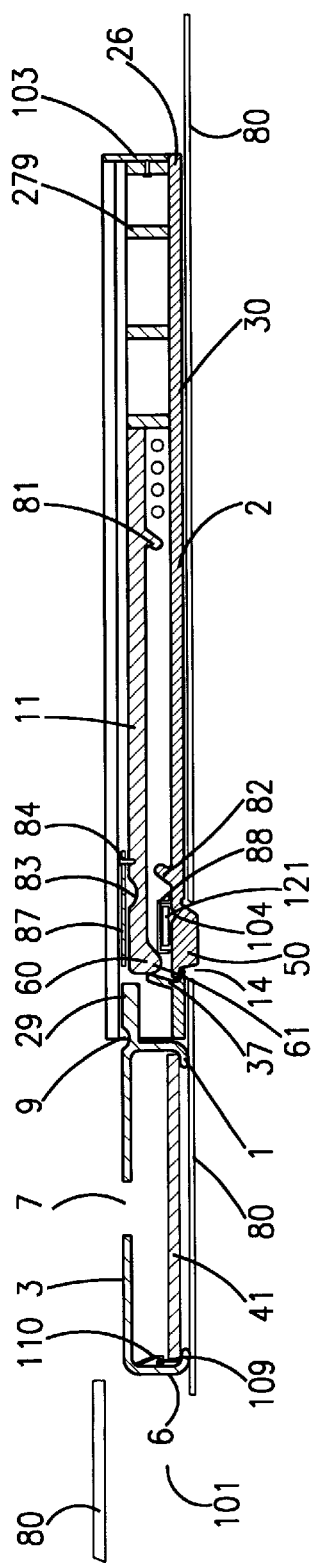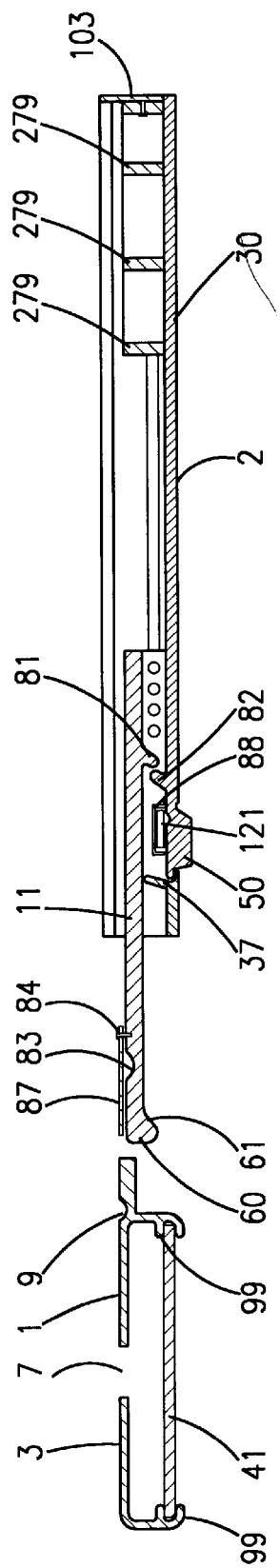

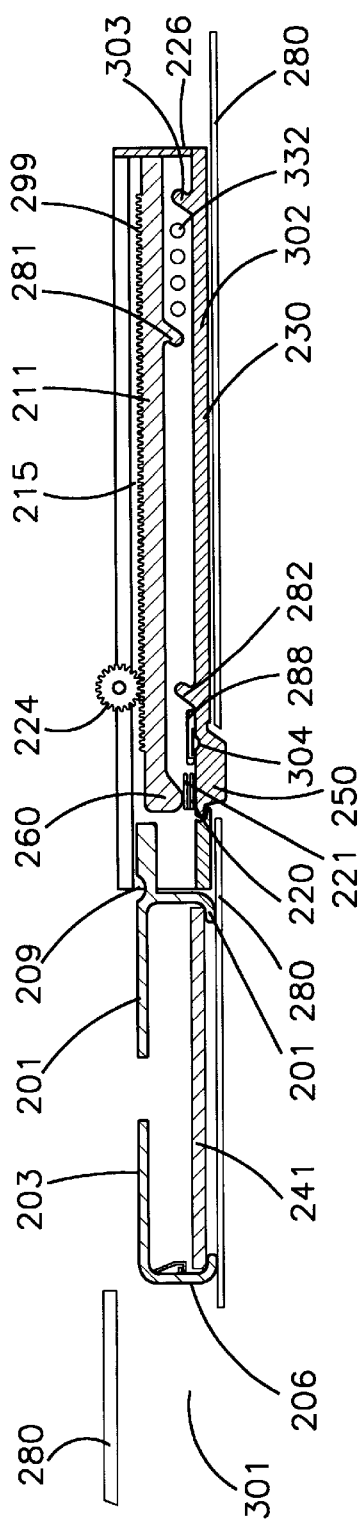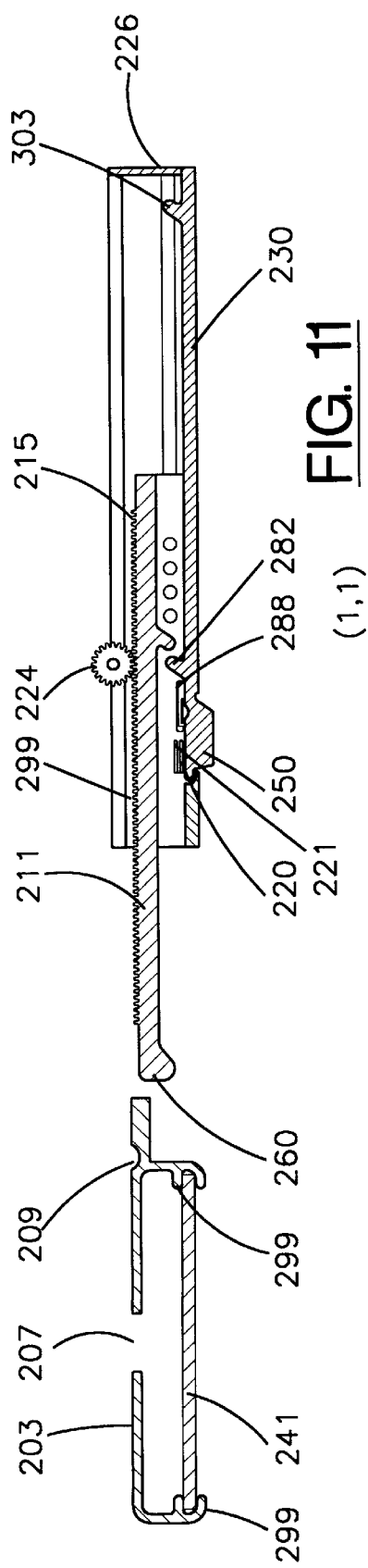

RECESSED SLIDE OUT VANITY MIRROR ASSEMBLY

CROSS-REFERENCE TO RELATED APPLICATIONS

This application is based on provisional application Serial No. 60/064,679, entitled RECESSED SLIDE OUT VANITY MIRROR ASSEMBLY, filed Nov. 3, 1997.

BACKGROUND OF THE INVENTION

1. Field of the Invention

The present invention relates to a method of operating a vanity mirror assembly for a vehicle. In particular, the present invention provides a method of operating a vanity mirror with a track assembly that is attached to a headliner. A vanity mirror housing attached to a track assembly slides from a recessed position above and parallel the headliner to an in use position. The vanity mirror assembly is designed to operate with a minimal of components and to be easily manufactured.

Also proposed is a vanity mirror assembly which is deployed or retracted by a drive mechanism connected to a track assembly. A motor will deploy a vanity mirror housing from a position hidden above and parallel the headliner to an in use position in the vehicle; and will retract the vanity mirror housing from an in use position to a hidden position between the headliner and sheetmetal roof. The vanity mirror housing is deployed and retracted through a slot in the headliner. The motor is activated by a user engaging a button.

Further suggested is a method of deploying a vanity mirror assembly from a position above the headliner to an in-use position within the vehicle. The vanity mirror assembly is attached to a rod that slides within a cylinder which is molded integral to a shelf.

2. Prior Art

Proposals have been put forward suggesting methods of operating and constructing a vanity mirror assembly for a vehicle. A recent suggestion for a recessed vanity mirror assembly noted in Applicant's U.S. Pat. No. 5,651,605 shows a method of deploying and retracting a vanity mirror assembly within a frame from behind the headliner. U.S. Pat. No. 5,651,605 furthers the art but doesn't propose a method that utilizes the lowest profile and the simplest of mechanisms.

The present invention addresses these issues by using a single slide mechanism which reduces the size of the mechanism and simplifies manufacturing of the component. The present invention also proposes a method of storage within the vanity mirror housing for tissue paper, and an imbedded light indicator in a mirror indicating a tissue holder is available.

Further, the present invention suggests a method of deploying and retracting a vanity mirror housing attached to a track assembly by using a motor or similar actuating device which is connected to a track assembly. The vanity mirror housing and track assembly would be above and parallel the headliner in the rested position and a vanity mirror housing would be driven forward through a slot in the headliner to an in use position within the vehicle. Once deployed forward, the vanity mirror housing can be angled down for use.

It is a still further object and purpose to construct a vanity mirror assembly that is attached to a rod. The rod slides within a cylindrical housing which is molded integral to a shelf which is secured to the top surface of the headliner and is below the sheetmetal roof of a vehicle. A button which depends down through a small opening in the headliner and into the interior of a vehicle can be used to deploy the vanity mirror assembly through a slot in the headliner and into an in-use position in the vehicle.

It is a further object and purpose to construct a vanity mirror assembly with a tissue holder integrated into the interior of the vanity mirror housing. A slot is placed on the top panel of the housing so tissue can be extracted for use. The tissue holder also has a lighting element placed behind the viewing side of the mirror to note to the user that there is a tissue holder available. The lighting element is behind the mirror and behind an etched out symbol and arrow in the mirror and therefore illuminates the symbols.

Accordingly, it is a principal object and purpose of the present invention to provide a lower profile and simpler method of operating a vanity mirror assembly from a recessed position between the vehicle headliner and sheetmetal roof into an in use position within the interior of the vehicle. The vanity mirror housing also is retractable back to a stowed position within a cavity created by the headliner and vehicle sheetmetal roof.

SUMMARY OF THE INVENTION

The present invention is directed to a vanity mirror assembly having a vanity mirror housing. The housing includes a mirror, lighting, and a compartment for tissue. There is a top panel and a bottom panel to the housing, a living hinge joins the top and bottom panels, which create a compartment for the lighting, mirror and tissue. The bottom panel has cut out openings for a mirror and for lighting. The top panel has a cut out opening so tissue can be extracted and used. There is a snap mechanism on the inside of the top and bottom panels side opposed to the hinge. This secures the panels together except when overcome by user force. When the housing panels are opened access is available so tissue can be placed inside behind the mirror and lighting elements could be replaced.

The vanity mirror housing is attached to a track assembly by a living hinge or other hinge mechanism. When in the stowed position, the track assembly is directly behind the vanity mirror assembly and on a plane parallel the vanity mirror housing. The track assembly is comprised of two interconnected elongated tracks. Each track is shaped like a flattened semiclosed C. One track has a top side, two side rails and two bottom rails. The other track has a bottom side two side rails and two top rails; each track creates a hollow elongated interior.

The outer track remains stationary above and secured to a headliner. The inner track is inverted and slides within the outer track. The inner track has a slightly narrower profile in width allowing it to slide longitudinally within the outer track. Bearings can optionally be placed between the outer and inner track. The bearings can be placed between the side rails of the tracks. The inner track is attached to the vanity mirror housing by a hinge and slides forward and rearward along with the housing.

Upon the bottom side of the outer track is an integrated button. The button is formed on the forward end or end near the vanity mirror housing of the outer track. A 3 sided cut is made in the bottom side of the center surface of the track; this leaves the back side as a living hinge. When a user wants to use the mirror, they push up on the forward side of the button which will then release the vanity mirror housing. This enables it to slide forward or rearward out of a slot in the headliner. A catch and stop tab hold the vanity mirror assembly in place until the button is pushed, which then releases the vanity mirror assembly.

The vanity mirror housing slides forward and out of a slot in the headliner. The slot is preferably placed just above and forward of the users head. The slots longitudinal sides are parallel the windshield of a vehicle. The assembly could obviously be placed above any of the seating positions in the automobile. The track assembly is attached above and to the headliner. The track assemblies outer track is secured to the headliner with glue and the inner track is free to slide within the outer track. The track assemblies longitudinal sides are perpendicular to the slot opening in the headliner. Molded to the interior of the inner and outer tracks top and bottom sides are stop tabs. The stop tabs keep the assembly and bearings from falling out once all the way deployed; or from being pushed to far in when being retracted. The tabs are created by cutting a three sided slot generally rectangular in shape in the top and bottom track. One tab can be centered and is placed near the back end of the inner track. The other tab is placed toward the forward end of the outer track and just behind the button on the outer track. Each tab is bent inward sufficient as to come into contract with each other when the inner track is slid forward in the outer track; but the tabs also clear the top and bottom tracks inner surface respectively. When the vanity mirror housing is slid forward the tab near the back of the inner track slides forward up to the stop tab on the outer track. Each protrudes from their surface enough that they cannot pass each other and therefore stop the track from being slid any further. The tabs could also be created by molding a raised area which is thicker upon the inner surface of either the inner track or outer track.

To use the assembly the user reaches up to the button protruding through a small opening in the headliner. The user pushes up on the button which can be back lit and the vanity mirror housing is forced forward toward the windshield and out of the elongated slot in the headliner. A spring secured to the back of the outer track is used to urge the assembly out. Once the button is pushed the inner track is forced forward by the spring and the attached vanity mirror housing slides forward parallel and above the headliner. The vanity mirror housing moves forward passed the slot in the headliner and is then rotated down by the user to the in use position inside the vehicle. The vanity mirror housing has the mirror on the bottom panel and a slot for tissue on the top panel. The lighting as shown is placed beside the mirror but could be placed upon the forward end of the inner track; this would eliminate the user looking directly into the lighting. If the lighting were placed on the inner track, the inner track would slide out past the slot in the headliner, exposing the light to the vehicles interior. The vanity mirror housing is closer to the front windshield of the vehicle than the track assembly. In other words the vanity mirror assembly slides forward toward the front windshield to deploy. A housing can be molded to the outside of the outer track to accommodate a small light bulb which then lights an illuminating strip which is placed within the outer track and above the mirror button. The mirror button can then be illuminated.

Another embodiment shows a vanity mirror assembly having a vanity mirror housing. The housing comprises a mirror, lighting components, and a compartment for tissue. There is a top panel and a bottom panel to the housing and a living hinge joins the top panel and bottom panel. The bottom panel has cutout openings for a mirror and for lighting. The top panel has a cut out opening so tissue can be extracted and used. There is a catch mechanism upon the interior of the top and bottom panels forward side or side opposed to the hinge side. This secures the sides together except when overcome by user force. When opened; tissue can be placed inside behind the mirror.

The vanity mirror housing is attached to a track assembly by a living hinge or other hingeable means. The track assembly is directly behind and attached to the vanity mirror housing. The track assembly is on a plane parallel the vanity mirror housing when the assembly is in the stowed position. The track assembly is comprised of two interconnected elongated tracks. Each of the tracks ends are shaped like a flattened semi closed C; one track has a top side, two side rails and two bottom rails. The other track has a bottom side two side rails and two top rails; each tracks shape creates a hollow interior along the longitude of each respective track. An outer track remains stationary above and secured to the headliners top surface. An inner track is inverted and slides within the outer track. The inner track has a slightly narrower profile in width, therefore allowing it to slide longitudinally within the outer track. Bearings can be placed between the outer and inner track; the bearings are placed between the side rails of the tracks. The inner track is attached to the vanity mirror housing with an integrally molded living hinge and slides forward and rearward with the housing.

Upon the bottom side of the outer track is an integrated pressure button. The pressure button is formed on the forward end or end near the vanity mirror housing of the outer track. A 3 sided cut is made in the bottom side of the center surface of the track; this leaves the forth side or back side as a living hinge. When the user pushes up on the pressure button it presses against a wafer thin actuator switch which activates a motor. A gear rack is molded to the top of the top side of the inner track; beginning at the forward end and extending to the rear of the inner track. The gear rack is generally centered on the top of the top side of the inner track; the gear racks longitudinal sides are perpendicular to the ends of the inner track. Along one side of the outer track are mounting holes for securing a motor to the outer track. The motor is mounted with the motors drive shaft perpendicular to the longitudinal sides of the tracks. Upon the end of the motor and motor shaft is a gear which meshes with teeth in the gear rack; thereby enabling the moving of the inner track forward deployed and rearward retracted. The motor is activated by the pressure button which is placed through an opening in the headliner and pressed by the user to activate. The motor would draw off the vehicles voltage system.

Once the pressure button is pushed by the user, the wafer thin actuator switch is pressed; the motor is activated; the vanity mirror housing and inner track slide forward parallel the headliner; the vanity mirror housing slides out of a slot in the headliner. The slots longitudinal sides are parallel the windshield of the vehicle. The slot is preferably placed just above and forward of the users head. And obviously could be placed above any of the seating positions in the automobile. The track assembly is attached above and to the headliner. The track assemblies longitudinal sides are perpendicular to the slot opening. The inner track slides longitudinally in the outer track. Molded to the inner and outer tracks inner top and bottom sides respectively are stop tabs. The stop tabs keep the assembly and bearings from falling out once it is all the way deployed. The tabs are created by cutting a three sided slot in the top or bottom track respectively. One tab is centered and is placed near the back end of the inner track. The other tab is placed near the front of the outer track behind the pressure button. This tab could be a stop sensor which once hit by the inner tracks stop tab would stop the motor. The tabs can be bent inward to the desired position. When the vanity mirror housing is slid forward, the tab near the back of the inner track slides forward up to the stop or sensor tab on the outer track. Each protrudes from their surface enough that they can not pass each other and therefore stop the track from being slid any further. The tabs could also be created by molding a raised area which is thicker than the rest of the track surface; upon the inner surface of either the inner track or outer track.

To use the assembly the user simply reaches up to the pressure button protruding through the opening in the headliner. The user pushes up on the pressure button which then presses the wafer thin actuator switch against a bump on the inner track and the vanity mirror assembly is driven forward by the motor which turns the attached gear; which then meshes with the gear rack teeth on the inner track; and moves the inner track and vanity mirror housing forward, the vanity mirror housing slides out of the elongated slot in the headliner. The vanity mirror assembly is now in the interior of the vehicle. The gear-rack which is integral to the inner track moves the inner track forward or rearward in the outer track which remains stationary and glued to the headliner. The vanity mirror housing moves forward out of the slot in the headliner and is then rotated down by the user to the in use position. The vanity mirror housing has the mirror on the bottom panel and a slot for tissue on the top panel. The bottom side being defined as the side facing the passenger. The lighting shown is placed beside the mirror but could be placed upon the forward end of the inner track; this would eliminate the user looking directly into the lighting. The vanity mirror housing is closer to the front windshield of the vehicle than the track assembly. In other words the vanity mirror assembly slides forward toward the front windshield to deploy. A housing can be molded to the outside of the outer track to accommodate a small light bulb which then lights an illuminating strip that is placed above the pressure button. The pressure button (M) can then be illuminated. The assembly can be retracted by pushing the pressure button again and the motor now reverses and returns the vanity mirror housing through the headliners slot and back to a rested state above the headliner and below the sheetmetal roof.

A still further embodiment has a vanity mirror housing resting above a headliner and adjacent a slot in the headliner. The vanity mirror housing is attached to an integrally molded rod which slides within a cylindrical housing. The cylindrical housing has an integrally molded shelf which is secured to the top of the headliner. The cylindrical housings longitudinal sides are perpendicular to the longitudinal sides of a slot in the headliner. A button is molded to the bottom side of the shelf and is placed through a small opening in the headliner and the button can then be pressed by a user. Once the button is pressed the rod is forced forward by a spring and the attached vanity mirror housing is forced through the slot and into the interior of the vehicle. The user can then grab the forward edge of the vanity mirror housing and bend down into use. When finished using the user bends the rod back parallel the headliner and pushes the mirror housing back into the slot. A catch holds the vanity mirror housing in the rested state until the button is pushed again.

BRIEF DESCRIPTION OF THE DRAWINGS

FIG. 3 is a sectional view showing the entire vanity mirror assembly in the rested position above the headliner.

FIG. 4 is a sectional view along lines (1,1) in FIG. 1, showing the assembly in a deployed forward position with the mirror housing still parallel the track assembly and not yet angled down.

FIG. 10 shows the alternate embodiment from a side cut away view showing the entire vanity mirror assembly in the rested position above the headliner. The gear rack can be seen and the gear can be seen near the front of the gear rack.

FIG. 11 is a cross section of the alternate embodiment shown in FIG. 8 taken along lines 1,1, showing the assembly in a deployed forward position with the mirror housing still parallel the track assembly and not yet angled down. The gearrack can be seen and also the gear can be seen as the gear is now near the back of the gearrack

DETAILED DESCRIPTION OF THE PREFERRED EMBODIMENTS

Figure 1:
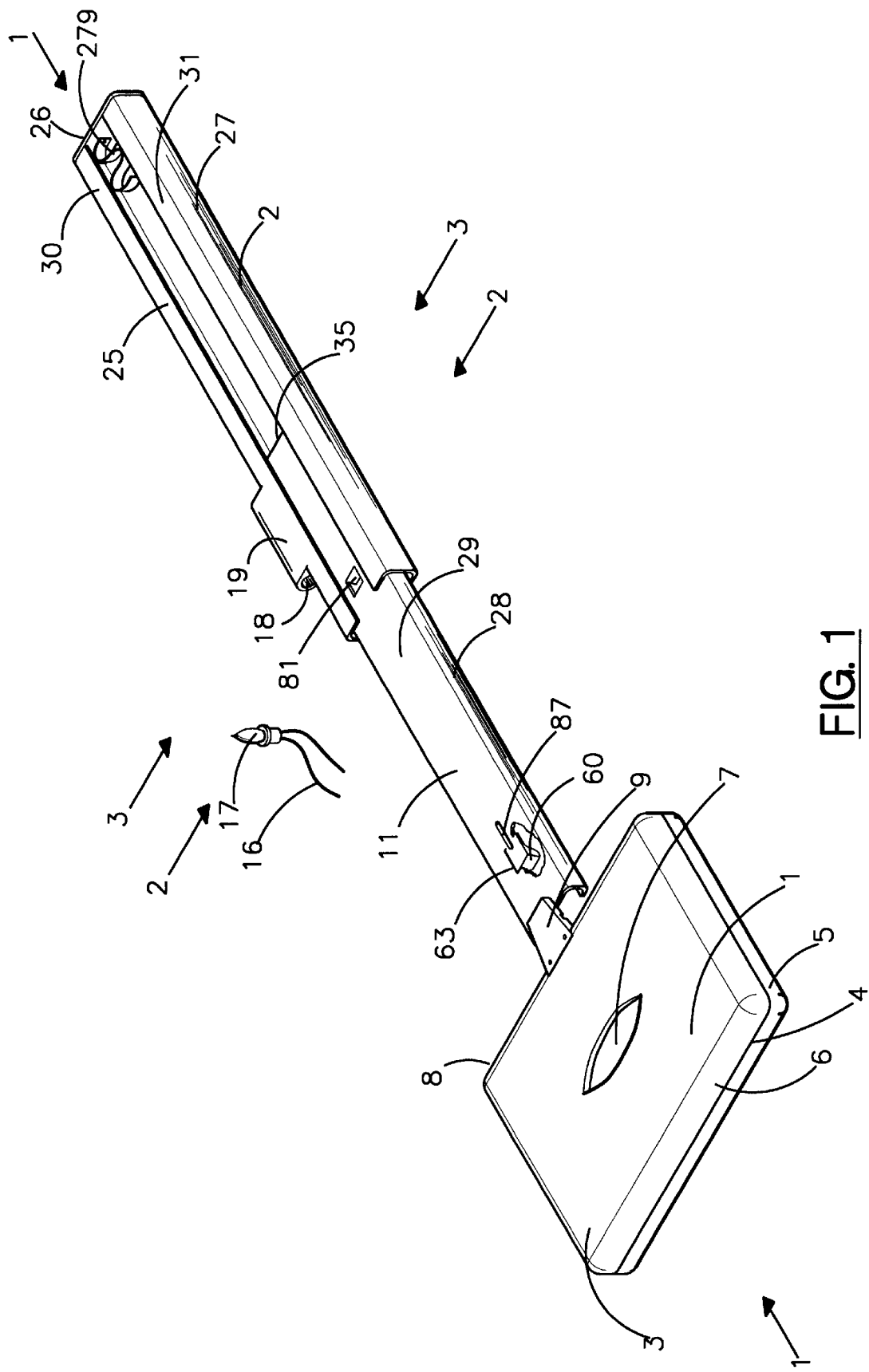
FIG. 1 is an isometric view of the vanity mirror assembly of the present invention looking at the top of the vanity mirror assembly. The top would be the side facing a vehicle sheetmetal roof in the rested position.

Referring to the drawings in detail, FIG. 1 illustrates a vanity mirror assembly in an isometric view. The view is looking down on the top of the assembly, the top side defined as the side which would face the sheetmetal roof of the vehicle. The assembly is comprised of a vanity mirror housing 1 which has a top panel 3 and a bottom panel 5. A cut out opening 7 is created in the top panel 3. The opening 7 allows users to remove tissue from the panel once the vanity mirror housing has been deployed forward and into the passenger compartment. The top panel 3 and bottom panel 5 have a living hinge on the back side 8 of the housing. When closed, the two panels form a seam 4 along the leading edge 6 and along the two end sides.

The vanity mirror housing 1 is attached to a track assembly 2 with a living hinge 9. The living hinge allows the vanity mirror housing to be parallel a vehicle roofline (not shown) in the rested position and allows the vanity mirror housing to be angled down when in use. The track assembly 2 has an inner track 11 upon which the living hinge 9 is attached or formed to the inner track top side. In this version, the living hinge is molded as a part of the track and mirror housing. Other types of hinge mechanisms are, of course, possible.

The inner track 11 is an elongated track which has a top side 29 which forms an elongated rectangle. The track is molded with two side rails, a side rail 28 and an opposing side rail (not visible in FIG. 1). Their respective surfaces are on a plane that is generally perpendicular to the top side 29 of the track. The track ends are shaped like a flattened semiclosed C. The track has a top side, two side rails and two bottom rails. This creates a hollow interior below the top side and along the longitude of the track.

The inner track 11 is placed within an outer track 30. The inner track is inverted and slid into the outer track. This makes the hollow interior of the inner track below the top side of the inner track. The outer track has a top rail 25 and top rail 31. The outer track has two side rails, side rail 27 and an opposing side rail which is parallel and adjacent to side rail 27; and a bottom side. The width of the inner track 11 is slightly less than that of the outer track 30. The width being the distance across the trailing edge 26 of the outer track relative to the distance across the trailing edge 35 of the inner track. A space or gap is provided between the side rails of the inner and outer tracks respectively so that bearings may be inserted. Holes would be drilled or molded into the inner track side rail 28 and the opposing rail adjacent, and parallel to the side rail 28. Bearings (not shown) would be placed in the holes and would now ride against the inner side rail walls of the outer track. The bearing hole diameter is slightly smaller than the diameter of the bearings and therefore the bearings ride in the holes and wouldn't slip through. This would allow for smooth sliding of the inner track. The bearings and holes are placed in the side rails starting at the back edge 35 of the inner track. The bearing structure ends just behind the inner tracks back stop tab 81. The stop tab keeps the inner track in the outer track and the bearing structure is stopped before the forward edge of the outer track.

Once the inner track is in place within the outer track, the attached vanity mirror housing can be slid forward and rearward. The track assembly longitudinal sides are perpendicular to the longitudinal sides of the vanity mirror housing and are perpendicular to the living hinge 9 of the vanity mirror housing. A light receptacle 19 can be molded to the outside of the outer track 30. The receptacle has a opening 18 in which a bulb 17 can be placed to light a illuminesant strip. The bulb has power supplied by the vehicle electrical system through wires 16. The light receptacle housing is molded to one of the longitudinal sides of the outside of the outer track with the opening and cavity also being displaced along the side edge of the rail.

A catch 60 is cut out of the inner tracks top side 29 and can be seen through the cut away. The catch 60 is closer to the forward edge of the inner track and just behind the living hinge 9. The catch is created by cutting three sides away and leaving the forth side molded to the inner track. A three sided slot 63 is formed. This forms generally a rectangle with three free sides and one living hinge. A flat spring 87 is then riveted above the catch and to the inner track. The flat spring applies pressure to the catch and keeps the catch top surface flush and parallel to the inner tracks top surface 29. The catch has a raised area on its underside inside the inner tracks interior which is thicker than the track and raised and curved inward. The raised area keeps the inner track and vanity mirror housing from deploying except when activated by the user.

A rear flat spring 279 is secured to the trailing edge 26 of the outer track 30. The rear flat spring applies force to the inner track trailing edge 35 when the vanity mirror assembly is in the rested position. When the button is pushed the rear flat spring forces the inner track and vanity mirror housing forward.

Figure 2:
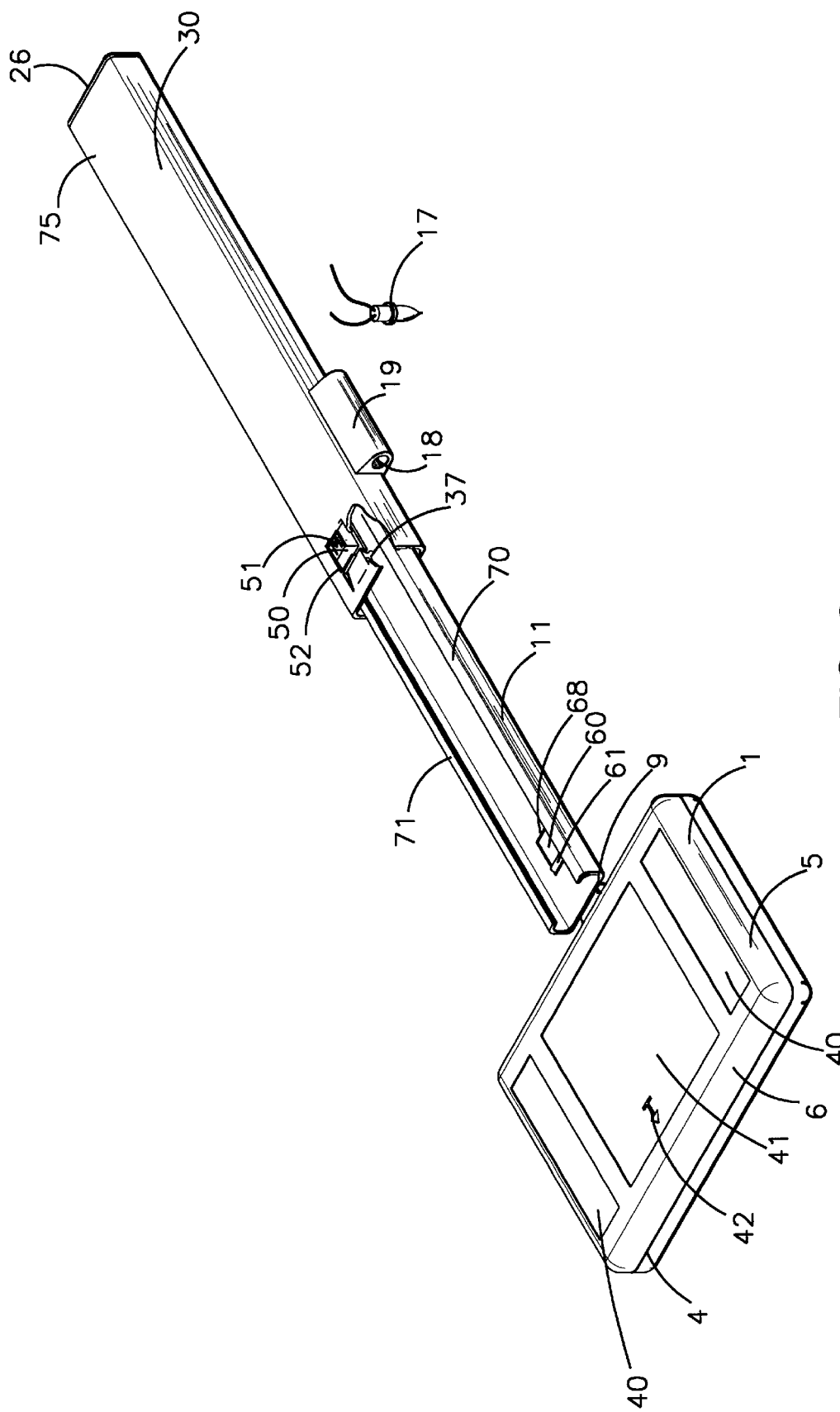
FIG. 2 is an isometric view of the vanity mirror assembly of the present invention showing the bottom side which would lie above and face a vehicle headliner. The bottom of the outer track assembly is shown. The bottom of the vanity mirror housing is also shown with the (T) tissue indicator shown imbedded in the mirror.

FIG. 2 shows the vanity mirror assembly flipped over so that the bottom side of the assembly is shown, the bottom side being defined as the side which would rest above the headliner and would be facing downward toward the interior of a vehicle. The vanity mirror housing 1 is shown with a bottom panel 5 showing a mirror 41 and lighting 40 set into the cutouts on the bottom panel. The back side of the mirror has the coating shaved away in the shape of a T (tissue) 42 and an arrow. This allows for illuminating the symbols, informing the user that a tissue holder is on the top side. The top panel and bottom panel snap together along the forward edge 6 and form a seam 4. A living hinge 9 attaches to or is formed on the top side of the inner track 11 and allows the vanity mirror housing to be parallel to a vehicle roofline and then to be angled down into an in use position once all the way forward. Near the forward edge of the inner track is a catch 60 which is formed integral with the inner track. The catch has a living hinge 68 on the trailing end or side closest to the trailing edge 26 of the outer track, and has two sides and a forward end that are not attached to anything. On the forward end is molded raised area 61 that is curved upward and out from the surface of the rest of the catch. The raised area has a tapered edge across the length of the raised area. The raised area rests against forward stop tab 37 which is molded from the outer track 30 near the forward end of the track. The forward stop tab has three sides cut away from the outer track and the fourth side near the forward end of the outer track left intact. The tab is then bent inward just enough that it is lower than the catch 60 raised area. When the vanity mirror assembly is in the rested or stowed position, the raised area of catch 60 now rests against the leading edge of the forward stop tab. When the user pushes up on a button 50, the button 50 pushes against the catch 60 and raises it just enough to clear the forward stop tab 37 and the vanity mirror assembly is now moved forward by spring force.

The bottom side of the inner track 11 is now seen and the bottom rails 70 and 71 respectively are shown. The bottom rails are parallel and adjacent the top side of the inner track. Each of the bottom rails is identical in width. The inner track 11 is slid into place into the outer track 30. The outer tracks bottom side 75 is seen with the button 50 showing. The pushbutton is formed integral to the outer track and is raised down off the bottom side 75. This allows the button to protrude down through a small opening in a headliner in a vehicle. The button is formed from a slot 52 being cut on three sides of the outer track. The slot allows for the button to be pushed upward. When a user pushes the button upward, the button releases the catch 60 from the forward stop tab 37 which is bent in to the interior on the underside of the bottom side 75 of the outer track. The button 50 has a symbol M 51 (Mirror) etched into it and could also have an arrow symbol etched into it. The M and arrow are translucent thereby allowing light to shine through in the dark. An illuminating strip can be placed above and behind the M and arrow and with the placement of a bulb along the strip. A light receptacle 19 can be molded to the side of the outside of the outer track, with an opening 18 for a light bulb 17 to be placed. This would allow for the Symbol M to be lit.

FIG. 3 shows a sectional side view of the assembly in place above a vehicle headliner 80. The vanity mirror housing 1 is shown in the recessed or stowed position, parallel above the headliner 80. The leading edge 6 of the vanity mirror housing can be seen resting above and within the headliner and just behind the slot 101 in the headliner. A latch 110 on the inside of the top panel 3 and the catch 109 can be seen interlocked. The user simply pushes in on the leading edge 6 of the vanity mirror housing and then the top panel and bottom panel unsnap allowing the user to place tissue within the housing. The tissue is placed just behind a mirror 41 and can be extracted by the user through opening 7 once the assembly has been deployed into the vehicle interior. The vanity mirror assembly is in front of the track assembly 2 and is attached to the inner tracks top side 29 by the living hinge 9. Immediately behind the living hinge 9 is the forward end of the inner track 11. Near the forward end of the inner track is the catch 60 which protrudes down into the cavity which is created by the inner and outer track. The catch has a flat spring 87 which is resting against the top surface of the catch; and the flat spring supplies sufficient force to keep the catches surface flush with the inner tracks top surface and keeps the catches raised area 61 down and in contact with the forward stop tab 37 which protrudes up from the outer track. The forward stop tab rises just high enough to prevent the inner track 11 from sliding forward by preventing the catch 60 from being forced forward. Just below the catch 60 is the button 50 which is molded from the outer track. It is formed from the outer tracks surface and comes down through a small opening 14 in the headliner. The button has a riveted flat spring 88 just above an illumination strip 121 and the spring supplies just enough pressure as to keep the button parallel the outer track 30. When the user presses up on the button 50, the button top surface contacts the bottom surface of the catches raised area 61 and presses it upward, up over the forward stop tab 37. The inner track 11 is thereby released. The inner track is forced forward by spring 279 or other means and will now move toward the slot 101 in the headliner. The vanity mirror housing now slides forward until a rear stop tab 81 on the inner track comes in contract with the stop tab 82 on the outer track. Once the inner tracks rear stop tab 81 hits the outer tracks stop tab 82 the vanity mirror housing and inner track will stop. The vanity mirror housing hinge 9 is now just beyond the slot 101 and the vanity mirror assembly can be angled down into the interior of the vehicle. Accordingly, the mirror is moved to a position in angular relation to the track.

When the user wants to return the vanity mirror assembly to the rest position they simply angle the vanity mirror housing back parallel to the headliner or roofline and push the vanity mirror housing and inner track backward away from the windshield. The vanity mirror housing will now slide backward and the inner track 11 will slide back in the outer track 30 and the catch 60 will then ride up over the forward stop tab 37. The vanity mirror housing and inner track will stop when the inner tracks trailing edge forces the flat spring 279 into a compressed state against the back wall 103 of the outer track. The catch 60 will now be forced back down by the flat spring 87 which is riveted 84 to the inner track. The catch is now behind the forward stop tab 37. The living hinge 9, the catch 60 and the button 50 may all be molded from their respective surfaces. Indentations, 83 and 104 allow the material to bend as a hinge.

Referring to FIG. 4 which is a cross section of the lines 1—1 in FIG. 1, the vanity mirror housing 1 can be seen deployed forward. The track assembly 2 can be seen. The inner track 11 is all the way forward with the rear stop tab 81 in contact with the outer tracks 30 stop tab 82. The vanity mirror assembly 1 is still parallel the inner track. The catches 60 raised area 61 can be seen as having cleared the forward stop tab 37. The mirror 41 is seen inside the housing 1 and is held in by a molded frame snaps 99. The cut out opening 7 in the top panel 3 can be seen. An area where tissue can be stored is created within the cavity of the vanity mirror assembly. The tissue is placed behind the mirror 41 and can be extracted through the opening 7 by the user once the assembly has been deployed forward and is angled down into the interior of the vehicle. The uncompressed rear flat spring 279 can be seen. Above the button 50 is an illumination strip 121 which supplies light to the button. The strip lies just above the button and is placed through a small slot in the side rail of the outer track to the lighting housing which contains a light bulb which shines light on the strip. The illumination strips longitudinal sides are perpendicular to the longitudinal sides of the track. A flat spring 88 is just above the illumination strip and supplies pressure to keep the buttons surface flush with the outer tracks surface except when the user pushes up on the button. The flat springs longitudinal sides are parallel the tracks' longitudinal sides and is perpendicular to and above the illumination strip. The button can be seen protruding down through a small opening 14 in the headliner.

Figure 5:
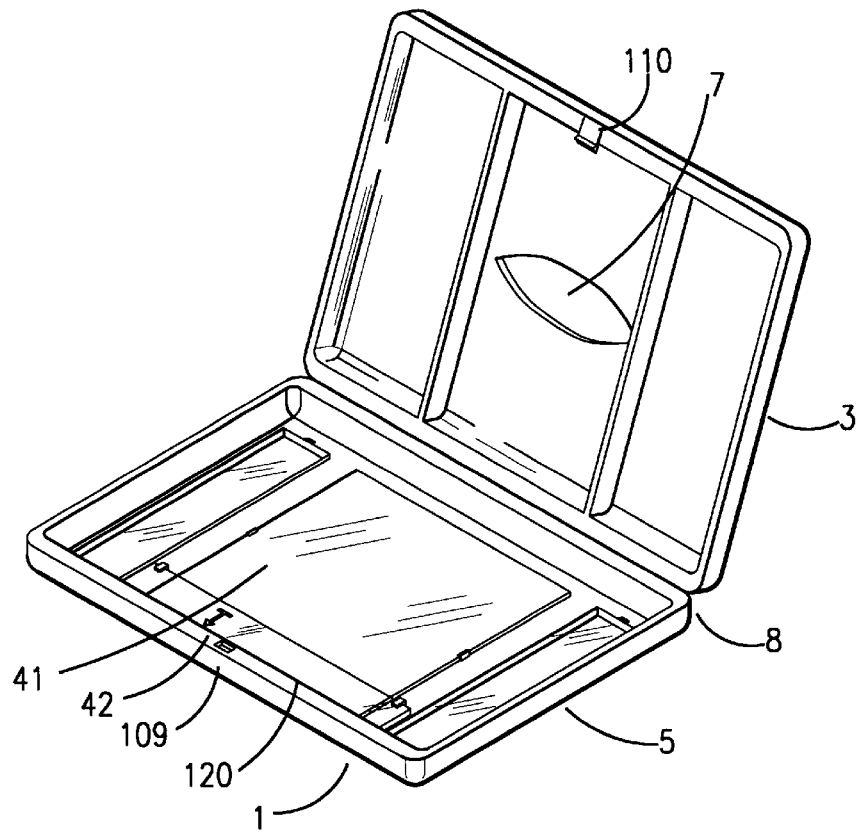
FIG. 5 is an isometric view of the vanity mirror housing opened and showing the lighting panels, mirror and a place for tissue storage inside the housing.

Now referring to FIG. 5, the vanity mirror housing 1 showing the top panel 3 and the bottom panel 5. The latch 110 which is shaped like a hook and is molded to the top panel 3 and the corresponding catch 109, which is an inverted triangle and is molded to the bottom panel. A living hinge 8 is along the back longitudinal side of the mirror housing. The opposed side is the side upon which the latch and catch can be placed. They are placed on the interior of the respective top and bottom panels and are generally centered. A mirror 41 is placed within the housing and has a T (tissue) 42 etched within the mirror. The backside of the mirror is seen. This allows light to shine through. Light is provided by a bulb mounted on either side of the mirror for lighting of the users face. An illumination strip 120 is run from a bulb in the housing to a position behind the symbol T 42; this lights the symbol. The bulbs would be placed above the lens panels which are beside the mirror. The illumination strip can be glued or secured by any common means to the inner surface of the bottom panel. Any common lighting arrangement could be used and is not shown.

Figure 6:
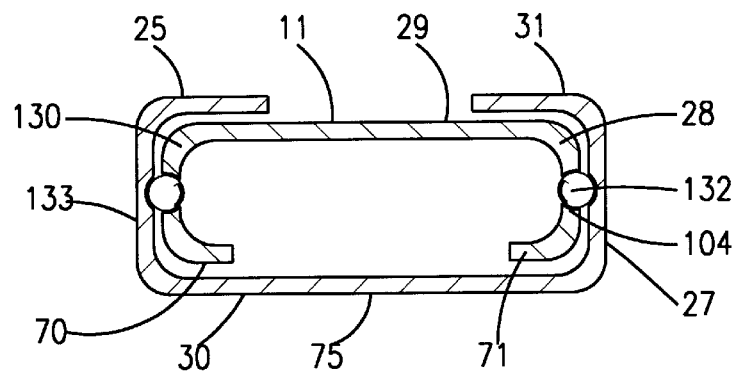
FIG. 6 is a sectional view along lines 2,2 of FIG. 1 showing the track assembly, the inner track, outer track and bearing structure.

FIG. 6 shows a cross section of 2—2 of FIG. 1 of the inner track 11 within the outer track 30. The inner tracks ends are shaped like a flattened semi closed C. The inner track has a top side 29 and side rails 28 and 130, respectively, and bottom rails 70 and 71 which create a hollow interior along the length of the track. The side rails perpendicular to the top side, have indentations 104 which allow for bearings 132 to be received. The hole diameter is slightly smaller than the diameter of the bearings. The bearings are now riding against the contoured inner surface of the outer tracks side rails and allow the inner track to glide easily forward and rearward longitudinally in the outer track 30. The inner tracks bottom rails 70 and 71 are parallel the top side of the inner track. The outer track has the same identical shape as the inner track; but has a wider profile across the width. The width being defined as the distance across the ends of the tracks: This allows for the inner track to be inverted and slid into place in the outer track with the bearings in place. The outer track has its bottom side 75 which lies below the bottom rails 70 and 71 of the inner track. The side rails of the outer track are 133 and 27. The top rails of the outer track are seen as 25 and 31 respectively and are parallel the outer tracks bottom side 75 and are outside and parallel the inner tracks top side 11.

Figure 7:
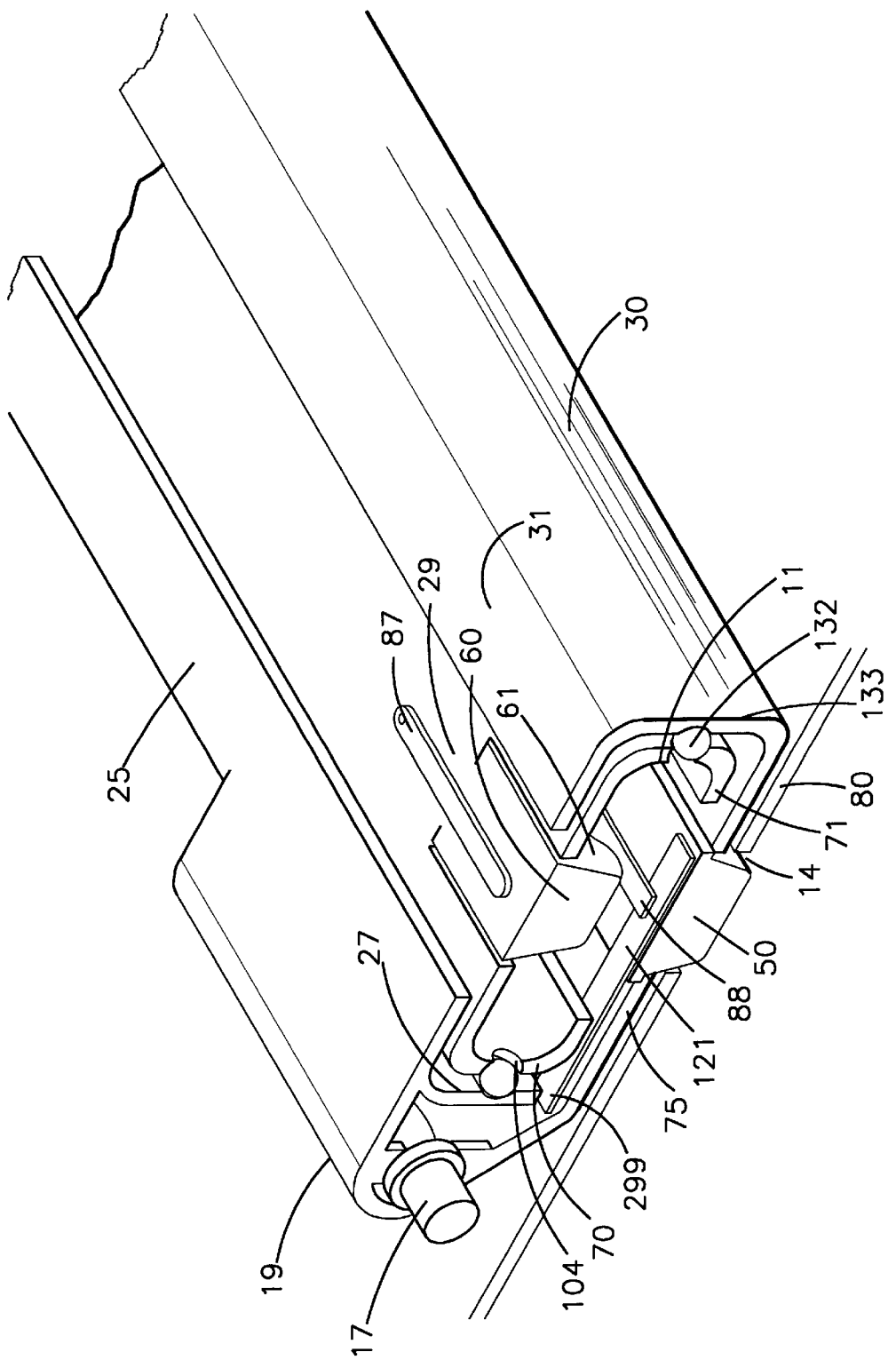
FIG. 7 is a sectional view along lines 3—3 of FIG. 1. This view shows the lighting and illuminant strip. The view also shows the inner and outer track and bearing structure with integrated outer track button and the inner track catch shown.

FIG. 7 is an enlarged view of a cut away isometric of the vanity mirror assembly taken at lines 3—3 of FIG. 1. This view shows the inner track 11 and the outer track 30. The inner tracks bottom rails 70 and 71 can be seen parallel and above the bottom side 75 of the outer track 30. The inner tracks bottom rails are held off of the surface of the outer track and up off of and over the illuminant strip 121 by the bearings 132. The bearings ride in the contoured area of the inside of the molded side rails of the outer track. The bearings are placed in cutout holes 104 in the inner tracks side rails. This suspends the inner track within the outer track and allows the inner track to move freely forward and rearward longitudinally in the outer track. The molded lighting housing 19 can be seen with the bulb 17 in place beside the illuminant strip 121 which is slid into place before the inner track is slid into the outer track. The illuminant strip is placed in the housing through a small slot 299 in the side rail 27. The illuminant strips longitudinal sides are perpendicular to the longitudinal sides of the track. The illuminant strip is then secured to the outer tracks bottom side by glue, rivet etc. and placed over the button 50. The button protrudes down from the outer track and is molded from the outer tracks bottom surface. It protrudes down through a small opening 14 in the headliner. A symbol M is etched out of the button 50 and the illuminant strip will then light the M. Above the illuminant strip is a flat spring 88 which is riveted to the inner surface of the bottom of the outer track and keeps the button parallel the surface of the outer track except when pushed up by the user. Just above the button, illuminant strip, and flat spring; is a catch 60 molded to the inner track which has a raised end 61. The catch is forced up by the button 50; when pushed by a user the illuminant strip and flat spring flex up into the catch and force it up. The inner track and vanity mirror housing are now forced forward by a rear spring. Not shown but in front of the catch mounted on the outer track is a stop tab that keeps the catch and inner track in place. A flat spring 87 mounted to the top side of the inner tracks top surface keeps the catch parallel the inner tracks top side except when a user pushes up on the button and then the catch is allowed up.

Figure 8:
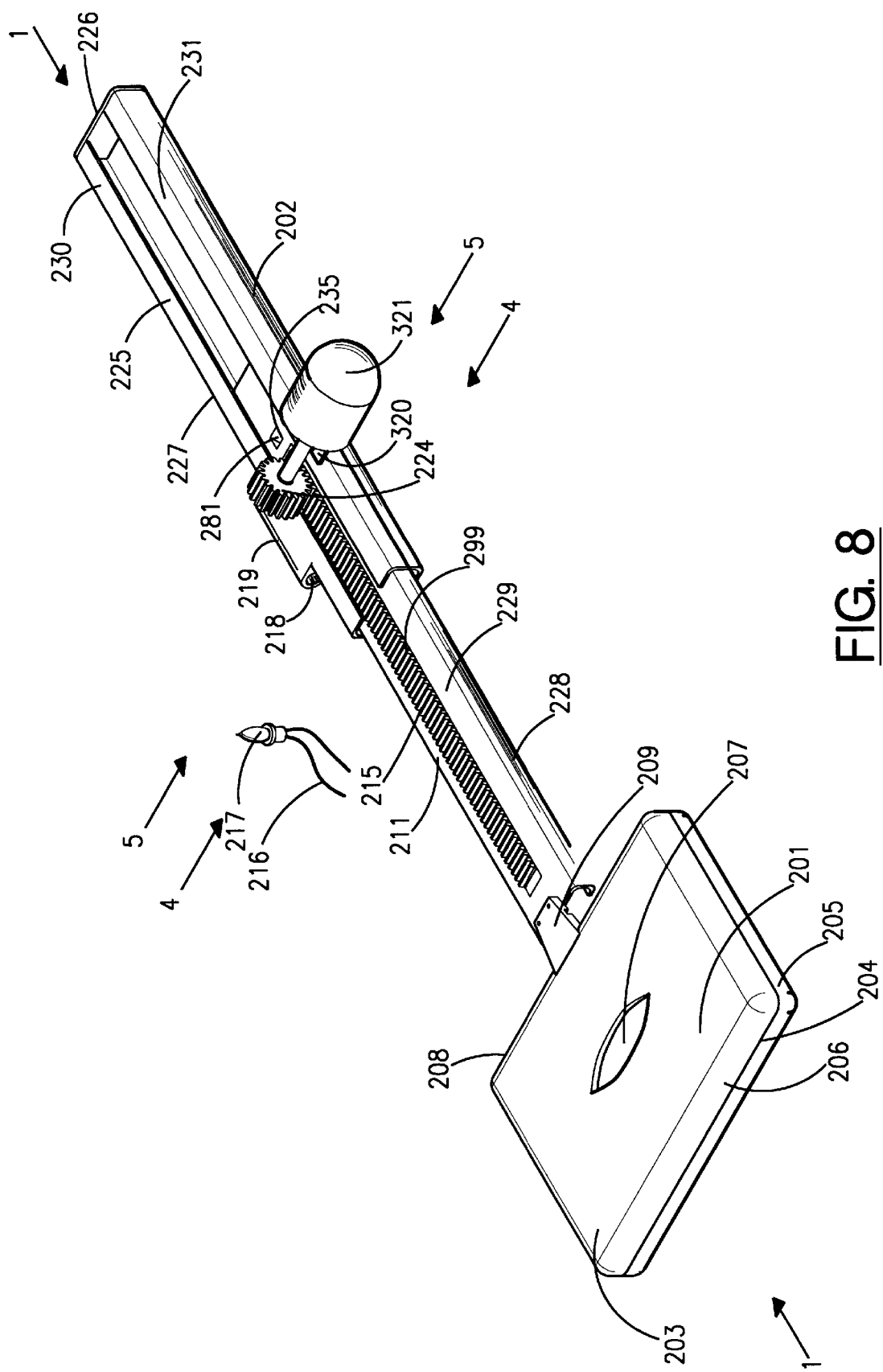
FIG. 8 is an isometric view of an alternate embodiment of the present invention looking down on the top of the vanity mirror assembly. The top would be the side facing a sheetmetal roof of a vehicle. The drive mechanism for the vanity mirror assembly with a motor and gear rack are visible.

FIG. 8 illustrates an alternate embodiment of a vanity mirror assembly shown in isometric view. The view is looking down on the top of the assembly. The top side being the side which would face the top sheetmetal roof of a vehicle. The assembly is comprised of a vanity mirror housing 201 which has a top panel 203 and a bottom panel 205. A cut out opening 207 is created in the top panel 203; the opening 207 allows users to remove tissue from the panel when the assembly has been deployed forward and angled down into the interior of the vehicle. The top panel 203 and lower panel 205 have a living hinge on the back side 208 of the housing. When closed the two panels form a seam 204 along the forward side 206 and along the two end sides. The vanity mirror housing is attached to a track assembly 202 with a living hinge 209. The living hinge allows the vanity mirror housing to be parallel a vehicle roofline in the rested position and allows the vanity mirror housing to be angle down when in use. The track assembly 202 has an inner track 211 upon which the living hinge 209 is attached or formed to the forward end of the top side 229 of the inner track. The inner track 211 is an elongated track which has a top side which forms an elongated rectangle. Upon the top surface of the topside of the inner track is a integrated gear rack 299. The gear rack is molded integral to the inner tracks top side and starts at the back edge 235 of the inner track and continues forward to the leading front edge of the inner track. The gear rack has raised teeth 215 which will mesh with a gear 224. The gear racks teethes surface or face are parallel the front and back edge of the inner track; and are perpendicular to the longitudinal sides of the inner track. The inner track is molded with two side rails; a side rail 228 and an opposing side rail. Their respective surfaces create a plane that is generally perpendicular to the top side 229 of the track. Each of the tracks ends are shaped like a flattened semiclose C; The track has a top side, two side rails and two bottom rails; creating a hollow interior along the longitude of the track. The inner track 211 is placed within an outer track 230. The inner track is inverted and slid into the outer track. The outer track has a top rail 225 and top rail 231. The outer track has two side rails, side rail 227 and an opposing side rail which is parallel and adjacent to side rail 227. The width of the inner track 211 is slightly less than that of the outer track 230. The width being the distance across the rear edge 226 of the outer track relative to the distance across the rear edge 235 of the inner track. A space or gap is provided between the side rails of the inner and outer tracks respectively so that bearings may be placed. Holes would be drilled or molded into the inner tracks side rail 228 and the opposing rail adjacent, and parallel to the side rail 228. The bearings would then be placed in the holes and would allow for smooth sliding of the inner track. The bearings and holes are placed beginning near the back edge 235 of the inner track and continue forward till the inner tracks stop tab 281. A stop tab 281 near the inner tracks trailing edge keeps the bearing structure from going past the forward edge of the outer track. The bearings would ride against the contoured inner walls of the side rails on the outer track. Once the inner track is in place within the outer track the vanity mirror housing can be slid forward and rearward. The track assemblies longitudinal sides are perpendicular to the longitudinal sides of the vanity mirror housing; and are perpendicular to the living hinge 208 of the vanity mirror housing. A light receptacle 219 can be molded to the side of the outer track 230. The receptacle has a hole 218 in which a bulb 217 can be placed to light a illuminesant strip. The bulb has power supplied by the vehicles electrical system through wires 216. The light receptacle housing is mounted to one of the longitudinal sides of the outside of the outer track with the opening and cavity also being longitudinally displaced along the side edge of the rail. A motor 321 is used to drive a gear 224 clockwise or counter clockwise. The motor is secured to the outer track 230 with two small integral mounting plates 320 which are mounted to the outside of the outer tracks top rail 231. The motor can be riveted to the outer track. The motor is mounted with the shaft being perpendicular to the longitudinal sides of the outer track. Upon the shaft of the motor is the gear 224 which has teeth that mesh with the gearack 215 teeth. When activated the motor drives the gear which engages the gearrack which then moves the inner track forward or rearward within the outer track. The inner track moves linearly forward and rearward and therefore moves the vanity mirror housing 201 forward and rearward as it is attached by the living hinge 209. It should be noted that the motor could be mounted on either side of the track.

The motor could also be remotely located and attached to a flexible shaft which would have a gear mounted on it. The gear would then drive the integral gearrack and inner track forward. Additionally, the inner track could be sprung out by a spring and gravity and then the motor could retract the inner track back in by use of a cord etc. No gear rack would be needed. The inner track and vanity mirror housing would be forced out by a flat spring or other means placed behind the inner tracks back edge. The inner track would then have a cord attached to its back edge and the cord would be retracted by the motor which would then retract the inner track and vanity mirror housing back up through the slot.

Figure 9:
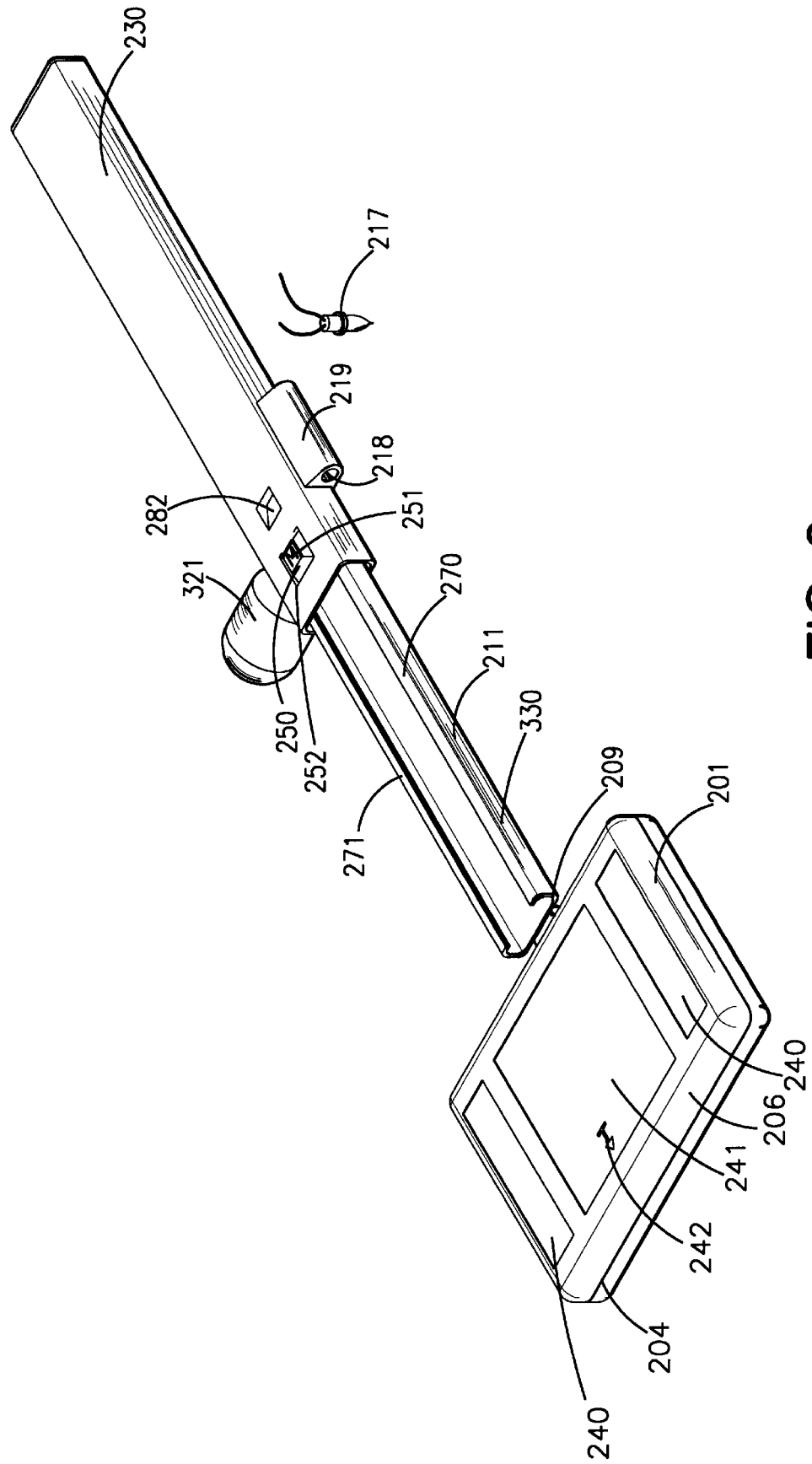
FIG. 9 shows the alternate embodiment shown in FIG. 8. The assembly bottom side which would lie above and face a vehicle headliner is shown. The bottom of the outer track assembly is shown with the lighted (M) mirror indicator showing. The motor can be seen as well as the pressure button. The bottom of the vanity mirror housing is also shown with the (T) tissue indicator shown.

Referring to FIG. 9 the bottom side of the outer track 230 is seen. Upon the bottom side of the outer track is a pressure button 250 which is molded from the track. The pressure button is cut out of the surface on three sides, leaving an opening 252; with the forth side left intact this creates a living hinge. Above the pressure button 250 is a wafer thin actuating switch (not seen) which is wired to the motor 321 which will drive the inner track 211 forward and rearward in the outer track 230. When the button 250 is pushed the actuator switch which is glued to the button; presses between the button and an inner track bump or raised area; this activates the motor. The inner track slides linearly in the outer track and causes the attached vanity mirror housing to slide forward and rearward. The button has a symbol M (mirror) 251 etched out and can be backlit. The inner track is molded with two side rails; a side rail 330 and an opposing side rail. Their respective surfaces create a plane that is generally perpendicular to the top side of the track. Each tracks end is shaped like a flattened semiclosed C and has a top side, two bottom rails and two side rails which creates a hollow interior along the longitude of the track. The sides of the track now form a hollow inner space. The inner track 211 is placed within the outer track 230. The inner track is inverted and slid into the outer track. The width of the inner track 211 is slightly less than that of the outer track 230. A space or gap is provided between the side rails of the inner and outer tracks respectively so that bearings may be placed. Holes are drilled or formed in the side rails of the inner track. The bearings ride in the holes and in contours formed in the side wall of the outer track. A small lighting housing 219 can be formed on the side of the outer track 230. A light bulb 217 can be placed within the hole 218. An illuminating strip placed within the outer track and just above the button will illuminate the symbol M 251 symbol.

The vanity mirror housing 201 can be seen. The bottom side being the side lying above the headliner and facing downward toward the interior of the vehicle. The vanity mirror housing 201 is shown with the bottom panel 205 showing the mirror 241 and lighting panels 240 set into the cutouts on the bottom panel. The back side of the mirror has the coating shaved away in the shape of a T (tissue) 242 and an arrow; this allows for illuminating the symbols, this tells the user that a tissue holder is on the top side. The top panel and bottom panel snap together along the forward edge 206 and form a seam 204. A living hinge 209 is formed with the inner track 211 and allows the vanity mirror housing to be parallel a vehicle roofline between the sheet-metal roof and headliner and then to be angled down into an in use position once the vanity mirror assembly has made it through the slot in the headliner and into the interior of the vehicle.

Now referring to FIG. 10; a side view of the alternate embodiment can be seen with the vanity mirror assembly 201 in the rested position. The gearrack 299 is seen with the gear teeth 215 engaged in the gear rack which is molded to the inner tracks 211 top surface. In the rested position shown, the motor (not shown) is toward the front of the assembly. The gear 224 is near the front of the inner track and mounted on the motor shaft which is just behind the gear. The vanity mirror housing 201 is just above a headliner 280. The vanity mirror housings leading edge 206 is resting just behind the slot opening 301 in the headliner. The top panel 203 of the vanity mirror housing can be seen. As the pressure button 250 which is molded from the outer track is pressed by the user, an actuating switch 221 activates a motor which drives the gear 224 which then turns. The actuating switch is glued or secured above the button and just above an illumination strip 220. When the user pushes up on the button the actuating switch is pressed against the inner tracks bump 260, which activates the motor. The gear teeth engage the gearrack 299 which is molded to the top side of the inner track. The inner track now moves linearly inside of the outer track 230.

A limit switch could be placed just behind the forward stop tab 282, and this could be used to stop the assembly automatically; once the rear tab 281 is slid forward and hits the forward stop tab 282 the motor is stopped. This prevents the inner track from going forward further and also keeps the bearings 304 from going past the front edge of the outer track.

FIG. 11 is a view of the alternate embodiment and cross section of (1,1) of FIG. 8 in a deployed position. The outer track 230 and its trailing edge 226 are behind the inner track 211 which has been moved forward by the integral gearrack 299. The gearrack teeth 215 have been engaged by the gear 224 which is upon a driveshaft which is turned by a motor which can not be seen. The vanity mirror housings top panel 203 can be seen. A slot 207 for tissue in the top panel is shown. A small actuator switch 221 is mounted above the illumination strip 220. When the pressure button 250 is pushed up by the user the actuator is activated and turns the motor clockwise or counter clockwise depending on the side its mounted. The inner track and integral gearrack are driven forward toward the slot 301. When the assembly is all the way forward the vanity mirror assembly can be rotated down into the interior of the vehicle and the mirror 241 can be used.

Figure 12:
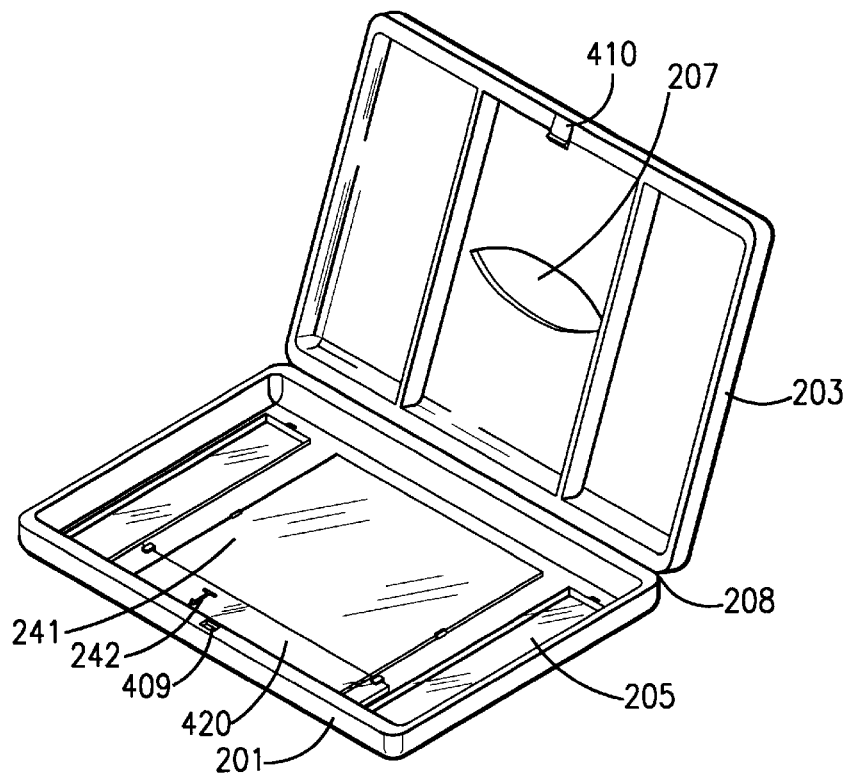
FIG. 12 is an isometric view of the alternate embodiment of the vanity mirror housing alone opened up and showing the lighting panels, mirror and a place for tissue inside the housing.

Now referring to FIG. 12; shown is the vanity mirror housing 201 with the top panel 203 and the bottom panel 205. The latch 410 is molded to the top panel 203 and the corresponding catch 409 is molded to the bottom panel. A living hinge 208 is along the back longitudinal side of the mirror housing. The opposed side is the side upon which the latch and catch can be placed. They are placed on the interior of the respective top and bottom panels and are generally centered. A mirror 241 is placed within the housing and has a T 242 (tissue) etched within the mirror. This allows light to shine through. Light is provided by the bulb mounted on either side of the mirror for lighting of the users face. A illumination strip 420 is run from the bulb in the housing to a position behind the symbol T 42, this lights the symbol. Any common lighting arrangement could be used and is not shown.

Figure 13:
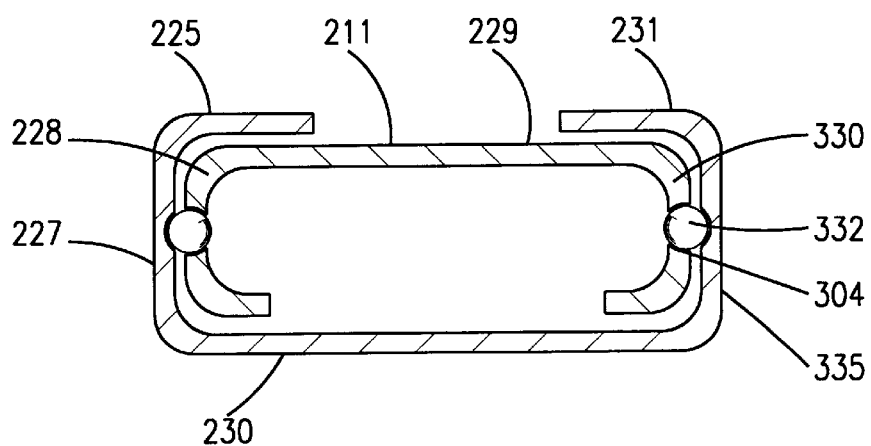
FIG. 13 is a sectional view taken along lines 4,4 of FIG. 8 showing the track assembly, the inner track, outer track and bearing structure.

FIG. 13 shows a cross section of the alternate embodiment with the inner track 211 and the outer track 230. The inner tracks ends are shaped like a flattened semi closed C. The inner track has a top side 229, side rails 228 an 330 respectively which have holes cut or molded 304 which allow for bearings 332 to be placed. The bearings allow the inner track to glide easily forward and rearward longitudinally in the outer track 230. The bearing ride against the contoured inner side rail walls of the outer track. The inner track is inverted and slid into place in the outer track with the bearings in place. The outer tracks side rails are seen and are 227 and 335 respectively. They form the side of the outer track assembly and continue up perpendicular to the bottom side of the outer track. The top rails 225 and 231 of the outer track are above and parallel the bottom side and above the top side 229 of the inner track 211.

Figure 14:
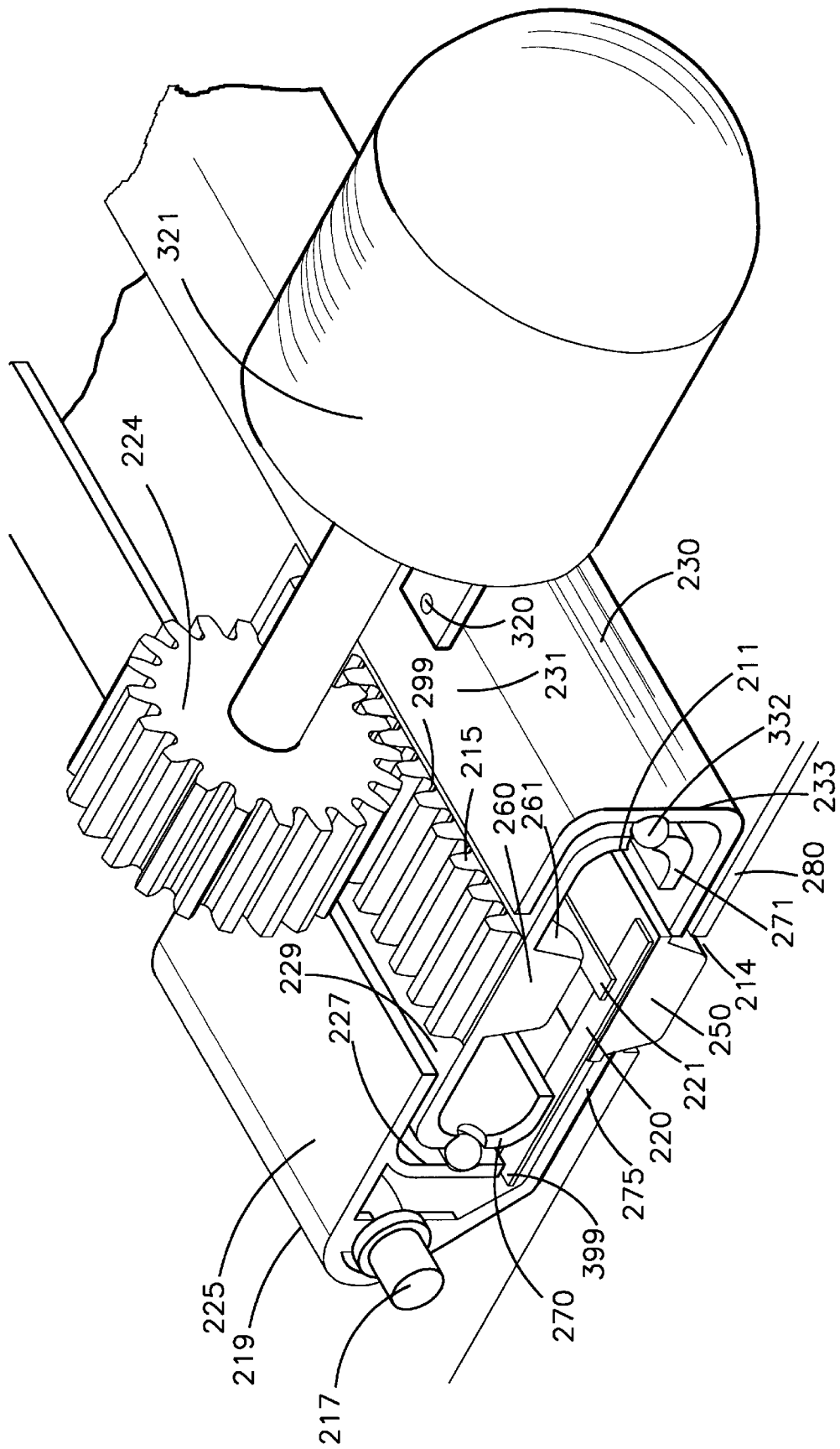
FIG. 14 is a sectional view taken along lines 5—5 of FIG. 8. This view shows the lighting and illuminant strip, the gear rack, gear and motor assembly. The view also shows the inner and outer track and bearing structure with integrated pressure button shown.

FIG. 14 is an exploded view of a cut away of the vanity mirror assembly at lines 5—5 of FIG. 8. This view shows the inner track 211 and the outer track 230. The inner tracks bottom rails 270 and 271 can be seen parallel and above the bottom side 275 of the outer track 230. The inner tracks bottom rails are held off of the surface of the outer track and up off of and over the illuminant strip 220 by the bearings 332. The bearings ride in the contoured area of the molded side rails of the outer track. The bearings are placed in cutout holes in the inner tracks side rails. This suspends the inner track within the outer track and allows it to move freely forward and rearward. The molded lighting housing 219 can be seen with the bulb 217 in place beside the illuminant strip 220 which is slid into place before the inner track is slid into the outer track. The illuminant strips longitudinal sides are perpendicular to the tracks longitudinal sides and is placed though a small slot 399 in the lower side of the outer tracks side rail. The illuminant strip is then secured to the outer track by glue, rivet etc. and placed over the pressure button 250. The pressure button protrudes down from the outer track and is molded from the outer tracks bottom surface. It protrudes down through a small opening 214 in the headliner and into the interior of the vehicle. A symbol M (mirror) is etched out of the button 250 and the illuminant strip will then light the M. Above the Illuminant strip is an actuator switch 221 which is secured with glue to the illuminant strip and pressure button; and when the button is pushed upward the actuator switch is pressed by the bump 260 and activates the motor 321. The motor then turns a gear 224 on the end of its drive shaft. The gear then meshes with a gearrack 299 which has teeth 215 molded all along the top side 229 of the inner track. Just above the pressure button, illuminant strip, and flat spring; is a bump 260 which has a raised end 261. Once the pressure button is pushed the actuator button is pressed against the raised end 261 and activates the motor which drives out the inner track. This forces the vanity mirror assembly out of the slot in the headliner and into the interior of the vehicle. In the rested position the vanity mirror and track assembly are between the headliner and sheetmetal roof of a vehicle.

Figure 15:
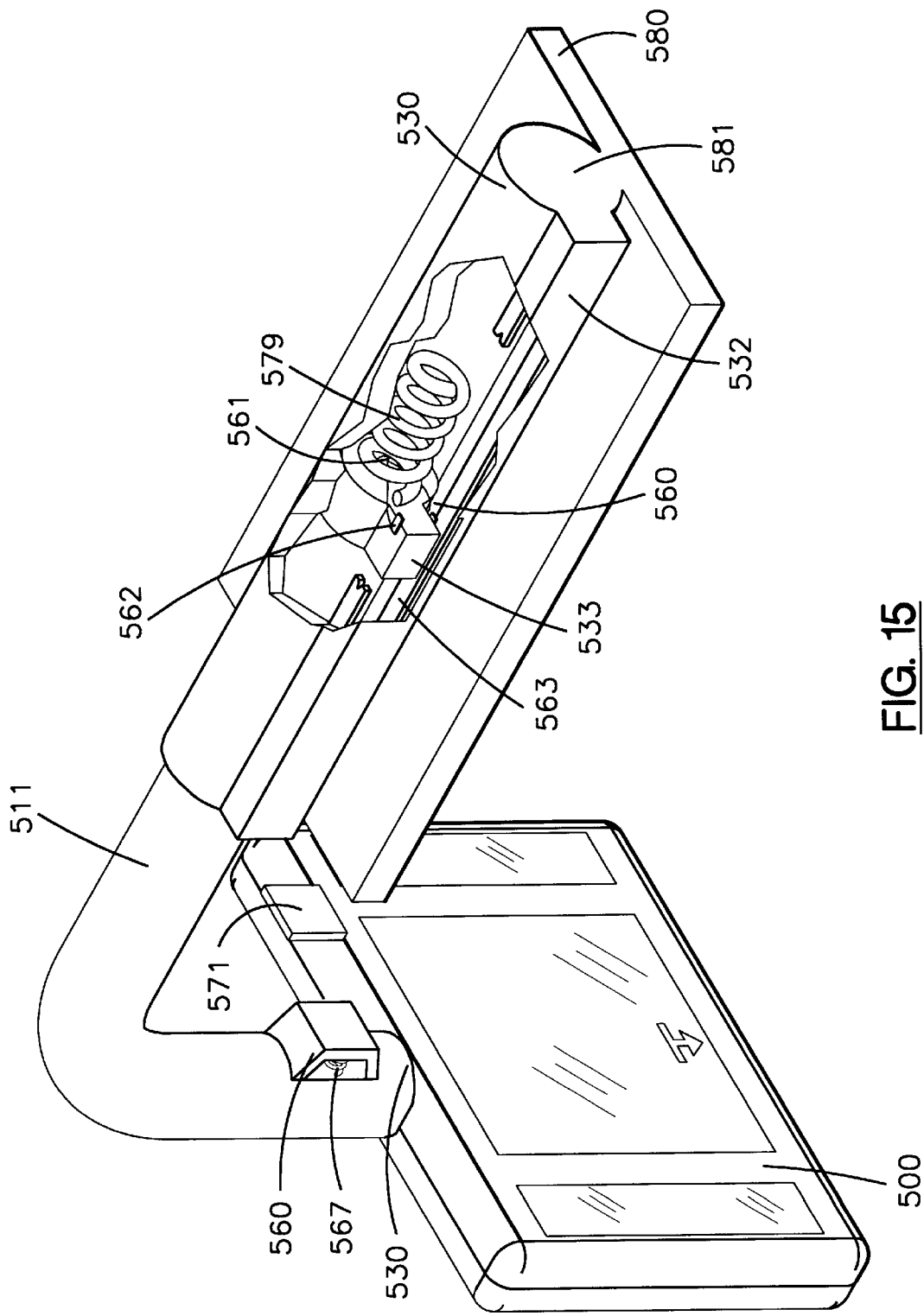
FIG. 15 is an isometric view of a further embodiment showing a mirror housing attached to a flexible rod which slides within a cylindrically shaped tube.
Figure 16:
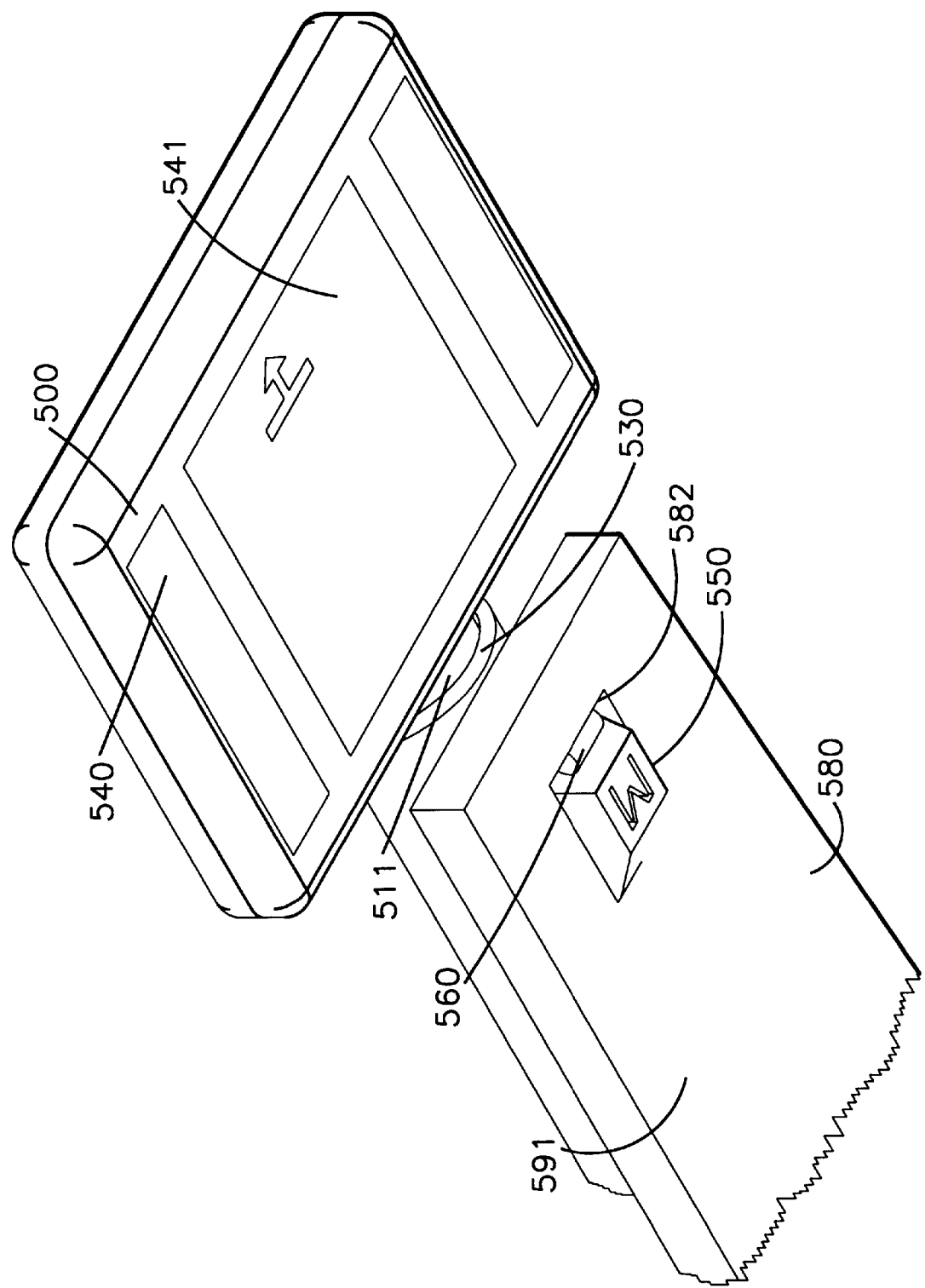
FIG. 16 is an isometric view of the further embodiment showing the bottom side or side which would lies against the top side of a headliner. It shows the pushbutton and integrally molded shelf and mirror assembly attached to the flexible rod.

FIG. 15 and FIG. 16 illustrates a still further embodiment with FIG. 15 showing a vanity mirror 500 attached to a flexible rod 511. The elongated flexible rod slides within an elongated hollow cylinder 530. The elongated hollow cylinder is molded of plastic and molded integral to a shelf 580. The shelf is glued or secured to the top side of a headliner of a vehicle. The longitudinal sides of the shelf are perpendicular to the longitudinal sides of a slot cut in the headliner for deployment of the vanity mirror housing into a vehicle. The vanity mirror, flexible rod and elongated hollow cylinder rest above a headliner when not in use. A slot would be cut in the headliner above any of the seating compartments. The slots longitudinal sides would be substantially parallel the front windshield of a vehicle. The slot cut is cut a little wider than the width of the vanity mirror assembly and is also cut high enough that the height of the vanity mirror or thickness of the vanity mirror can slide through the slot. The slot would be trimmed out with molding to match the interior of the vehicle.

In the view shown the vanity mirror assembly and elongated flexible rod have been deployed from the elongated hollow cylinder and a latch 560 can be seen near the forward end 530 of the flexible rod. The latch is molded integral to the flexible rod and has a living hinge on the back side and is then formed with a curved arch at the back and an abrupt front edge that then forms down into a lower lip that is slid under the forward edge of the slot in the flexible rod. The latch holds the assembly in place when not in use. A small latch coil spring 567 is secured to the under side of the latch and compresses against the underside of the latch and against the back wall of the flexible rod. This causes the latch to be held in an extended position except when pushed in. At the trailing end of the flexible rod is a rod coil spring 579 that urges the elongated flexible rod out once the latch is released. In the rested state the rod coil spring presses against the back wall 581 of the elongated hollow cylinder. The coil spring is secured to the end of the elongated flexible rod with a rivet. On the trailing end of the flexible rod is a notched protrusion 533 which is molded as a part of the flexible shaft and has three rectangular sides that slide in an elongated slot 532 formed as a part of the elongated hollow cylinder. The notched protrusion slides within the elongated slot and keeps the flexible rod from rotating or being rotated by the user as the vanity mirror assembly is slid out and into the interior of the vehicle. Once slid out the vanity mirror assembly which is attached to the flexible rod; can be bent down into use. The rod coil spring urges the mirror housing out just far enough that is can be grabbed by the user. The user then pulls the mirror out and pulls down on the mirror housing which will bend the flexible shaft.

Electrical wire 560 is run through a hollow hole 561 in the elongated flexible shaft and is attached inside the mirror housing by common known means. The wire is attached to the trailing end of the flexible shaft at contact points 562. The copper contact points are riveted to the top and bottom sides of the semi-rectangular protrusion. The copper contact points slide within the elongated slot 532. On the top and bottom sides of the interior of the elongated slot are two strips of copper band 563. The copper bands are riveted to the interior top and bottom sides of the elongated slot; and toward the back of the elongated slot stop short of the back end. The copper bands have electrical wires 561 attached; which are connected to the vehicles power supply and therefore power is supplied to the mirror housing once the mirror has been released from the rested state. The bands stop short of the back of the elongated cylindrical housing so in the rested state there is no power and the lighting is therefore off.

In FIG. 16 the bottom side of the mirror housing 500 and shaft assembly can be seen. The shelf's bottom side 591 which would be facing and against a vehicles headliner is seen. A pushbutton 550 molded from it. The pushbutton is cut on three sides leaving the back side as a living hinge. The forward end of the button can be pushed up by the user. When the forward end of the pushbutton is pushed up it presses up on the spring loaded latch 560 which is molded to the flexible shaft. Pushing up causes the latch to move up off of the forward ledge 582 of the shelfs cut out opening and a rod coil spring now urges the flexible rod 511 forward and out of the elongated hollow cylindrical housing 530. A small opening a little bigger than the pushbutton is cut in a headliner and the button depends down into the opening and into the interior of a vehicle. The mirror housing 500 which is molded to the leading end of the flexible rod is forced forward. The mirror 541 can then be used and has a couple of lighting panels 540 for lighting.

Whereas, the present invention has been described in relation to the drawings attached hereto, it should be understood that other and further modifications, apart from those shown or suggested herein, may be made within the spirit and scope of this invention.

What is claimed is:

1. A vanity mirror assembly, which comprises:
   a track having a first end, said track moveable between a stowed and an extended position, said track juxtaposed between a headliner and a roof of a vehicle substantially parallel to said headliner;
   a mirror extending from said first end of said track, said mirror retained within a housing having a top panel and a bottom panel which are hinged to each other; and
   a hinge between said first end of said track and said housing, whereby said housing may rotate between a position parallel to said track and a position in angular relation thereto.

2. A vanity mirror assembly as set forth in claim 1 wherein said housing includes lighting and a tissue holder.

3. A vanity mirror assembly as set forth in claim 1 including a stationary outer track portion and wherein said track includes a moveable inner track portion, said portions telescoping about each other.

4. A vanity mirror assembly as set forth in claim 3 including a plurality of bearings between said inner track portion and said outer track portion.

5. A vanity mirror assembly as set forth in claim 3 wherein said outer track portion and said inner track portion are each formed as an elongated rectangle.

6. A vanity mirror assembly as set forth in claim 3 wherein said inner track portion is moved by a motor.

7. A vanity mirror assembly as set forth in claim 3 including a plurality of rolling elements between said inner track portion and said outer track portion.

8. A vanity mirror assembly as set forth in claim 3 wherein said inner track portion is forced from said stationary outer track portion by a spring within said outer track portion.

9. A vanity mirror assembly as set forth in claim 8 wherein said inner track portion is retained in said stowed position within said outer track portion by a catch which engages a stop tab.

10. A vanity mirror assembly as set forth in claim 9 including a button mechanism to disengage said catch from said stop tab, allowing said spring force to move said inner track portion.

11. A vanity mirror assembly which comprises:
    a cylindrical, telescoping rod which moves between an extended position and a stowed position within a cylindrical housing, said cylindrical housing juxtaposed between a headliner and a roof of a vehicle, said roof substantially parallel to said headliner; and
    a mirror attached to one end of said rod, said mirror retained within a housing having a top panel and a bottom panel which are hinged to each other; and
    a hinge between said rod and said housing whereby said housing is moveable between a position parallel to said rod and a position in angular relation thereto.

12. A vanity mirror assembly as set forth in claim 11 wherein said rod is forced from a stowed position to an extended position by a spring.

13. A vanity mirror assembly as set forth in claim 11 wherein said cylindrical rod is bendable.

14. A method to use and store a vanity mirror assembly, which comprises:
    unlatching an inner moveable rod portion having a mirror attached thereto from a stationary outer cylindrical portion;
    forcing said inner moveable rod portion from said outer cylindrical portion by a spring; and
    rotating said mirror on a hinge between said inner moveable rod and said mirror between a position parallel to said rod portion and a position in angular relation thereto.

15. A method to use and store a vanity mirror assembly as set forth in claim 14 wherein said inner rod is unlatched from said outer cylinder by a catch extending from said inner ord which engages a stop tab on said outer cylinder.

* * * * *